United States Patent
Eckerson et al.

(10) Patent No.: US 10,340,746 B2
(45) Date of Patent: *Jul. 2, 2019

(54) CONTACT POINT POWER PAD FOR BATTERY CHARGER

(71) Applicant: Jabil Inc., St. Petersburg, FL (US)

(72) Inventors: David M. Eckerson, St. Petersburg, FL (US); Salman Talebi-Rafsanjan, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,615

(22) Filed: Jun. 14, 2017

(65) Prior Publication Data

US 2017/0346331 A1 Nov. 30, 2017

Related U.S. Application Data

(63) Continuation of application No. 14/668,504, filed on Mar. 25, 2015, now Pat. No. 9,735,608.

(Continued)

(51) Int. Cl.
*H02J 7/00* (2006.01)
*H02J 50/12* (2016.01)
(Continued)

(52) U.S. Cl.
CPC ............ *H02J 50/12* (2016.02); *H02J 7/0044* (2013.01); *H02J 7/025* (2013.01); *H02J 50/05* (2016.02)

(58) Field of Classification Search
USPC ....................................................... 320/108
See application file for complete search history.

(56) References Cited

U.S. PATENT DOCUMENTS 7,744,389 B1 * 6/2010 Morris ................... H01R 13/66
439/151
7,982,436 B2 * 7/2011 Randall ................. G06F 1/1626
320/113
(Continued)

FOREIGN PATENT DOCUMENTS

WO 2010/050958 A1 5/2010

OTHER PUBLICATIONS

International Search Report and Written Opinion, dated Jul. 7, 2016 for PCT/US2016/024226.

(Continued)

*Primary Examiner* — Samuel Berhanu
(74) *Attorney, Agent, or Firm* — Thomas J. McWilliams; Barnes & Thornburg LLP

(57) ABSTRACT

An apparatus, system and method for providing a contact point power pad for use with a battery charger, such as may reside in a mobile device. The apparatus, system and method may include a base insulation pad, a plurality of alternately charged strips electrically connected to at least one voltage source and physically atop the base insulation pad, and a plurality of raised insulating ridges interstitially between alternating ones of the alternately charged strips. The apparatus, system and method may also include a mobile device for use with a power pad. The mobile device may include three contact balls electrically associated with at least one battery charger for providing charging power to the at least one battery charger.

20 Claims, 4 Drawing Sheets

Related U.S. Application Data

(60) Provisional application No. 61/974,049, filed on Apr. 2, 2014.

(51) Int. Cl.
*H02J 50/05* (2016.01)
*H02J 7/02* (2016.01)

(56) References Cited

U.S. PATENT DOCUMENTS

| | | |
|---|---|---|
| 2005/0237691 A1 | 10/2005 | Dayan et al. |
| 2007/0194526 A1* | 8/2007 | Randall |
| 2009/0072782 A1* | 3/2009 | Randall ................ G06F 1/1616 320/107 |
| 2009/0098750 A1* | 4/2009 | Randall ................ G06F 1/1616 439/77 |
| 2009/0243396 A1 | 10/2009 | Randall |
| 2010/0156197 A1 | 6/2010 | Randall |
| 2010/0219183 A1* | 9/2010 | Azancot ................ H01F 38/14 219/676 |
| 2010/0290215 A1 | 11/2010 | Metcalf |
| 2011/0215755 A1* | 9/2011 | Hwang ................ H02J 7/00 320/108 |
| 2012/0011707 A1 | 1/2012 | Morris et al. |
| 2013/0057202 A1 | 3/2013 | Lee et al. |

OTHER PUBLICATIONS

Supplemental European Search Report, dated Jan. 31, 2018 for EP16780433.

* cited by examiner

CONTACT POINT POWER PAD FOR BATTERY CHARGER

CROSS-REFERENCE TO RELATED APPLICATIONS

This application claims priority to U.S. application Ser. No. 14/668,504, entitled "CONTACT POINT POWER PAD FOR BATTERY CHARGER", filed on Mar. 25, 2015, which claims priority to U.S. Provisional Application No. 61/974,049, entitled "CONTACT POINT POWER PAD FOR BATTERY CHARGER", filed on Apr. 2, 2014, the entirety of which are incorporated herein by reference.

BACKGROUND

Field of the Invention

The present disclosure is directed generally to power transfer, and more particularly is directed to a contact point power pad for battery charging power battery chargers, and other power applications.

Background of the Disclosure

Wireless charging is known. More particularly, inductive charging, such as using charging pads or charging mats, is well known. Efforts have recently also advanced with regard to radio-frequency (RF) wireless charging. Although wireless charging methodologies may include physical contact between the charger and the device receiving the charge, most wireless charging methods do not require contact between the charger and the charge-receiving device.

Some methodologies of wireless charging may require contact between the charger and the receiving device. In an exemplary method, alternately charged (i.e., positive and negative) points, strips, pads, or the like may be provided on a charging mat or pad, and may be suitable to receive charge-receiving raised locations on the device in need of a charge.

Although such contact-based wireless chargers may be simpler, and hence less expensive, and faster in providing a charge than non-contact wireless chargers, various issues are nevertheless present in the use of current contact-based wireless chargers. For example, to ensure contact with alternately charged pads, points, strips or the like, more than two raised locations may be required on the charging device. Moreover, due to possible unevenness in the charging surface of the charging mat or pad having the alternately charged points, pads, or strips, flexibility may be needed in the raised charging locations on the device in need of charging to ensure good contact between at least two of the device's "charging bumps" and at least two of the alternately charged charging features of the power pad.

Also, the use of an undesirably large number of raised charge receiving locations on a device in need of charging increases the expense and difficulty in manufacturing the mobile device. These drawbacks are exacerbated by the need to provide flexibility in each of the charge receiving locations in anticipation of an uneven charging surface, due to the need for good contact between the charge receiving locations and the charging device surface.

Therefore, the need exists for a contact-based wireless charging apparatus, system and method that minimizes the number of charge receiving locations needed on a device, and that eliminates the need to provide flexibility in the charge receiving locations on the device to account for unevenness in the charging surface.

SUMMARY OF THE DISCLOSURE

The disclosure is directed to an apparatus, system and method of providing a contact point power pad for use with a battery charger, such as may reside in a mobile device. The apparatus, system and method may include a base insulation pad, a plurality of alternately charged strips electrically connected to at least one voltage source and physically atop the base insulation pad, and a plurality of raised insulating ridges interstitially between alternating ones of the alternately charged strips. The plurality of alternately charged strips may comprise one of copper and aluminum. The plurality of raised insulating ridges may comprise a low coefficient of friction. The plurality of raised insulating ridges may have one of a rectangular, a square, an ellipsoidal, a triangular, a hexagonal, a pentagonal, and a hemispherical shape. The plurality of raised insulating ridges may comprise a composition of one of a plastic, a rubber, and a dieletric.

The apparatus, system and method may also include a mobile device for use with a power pad. The mobile device may include a microprocessor capable of providing operations, at least one battery for providing power to at least the microprocessor, at least one battery charger capable of charging the battery, and three contact balls electrically associated with the at least one battery charger for providing charging power to the at least one battery charger.

Thus, the disclosure provides a contact-based wireless charging apparatus, system and method that minimizes the number of charge receiving locations needed on a device, and that eliminates the need to provide flexibility in the charge receiving locations to account for unevenness in the charging surface.

BRIEF DESCRIPTION OF THE FIGURES

The present disclosure is illustrated by way of example and not limitation in the figures of the accompanying drawings, in which like references indicate similar elements and in which.

DETAILED DESCRIPTION

Figure 1:
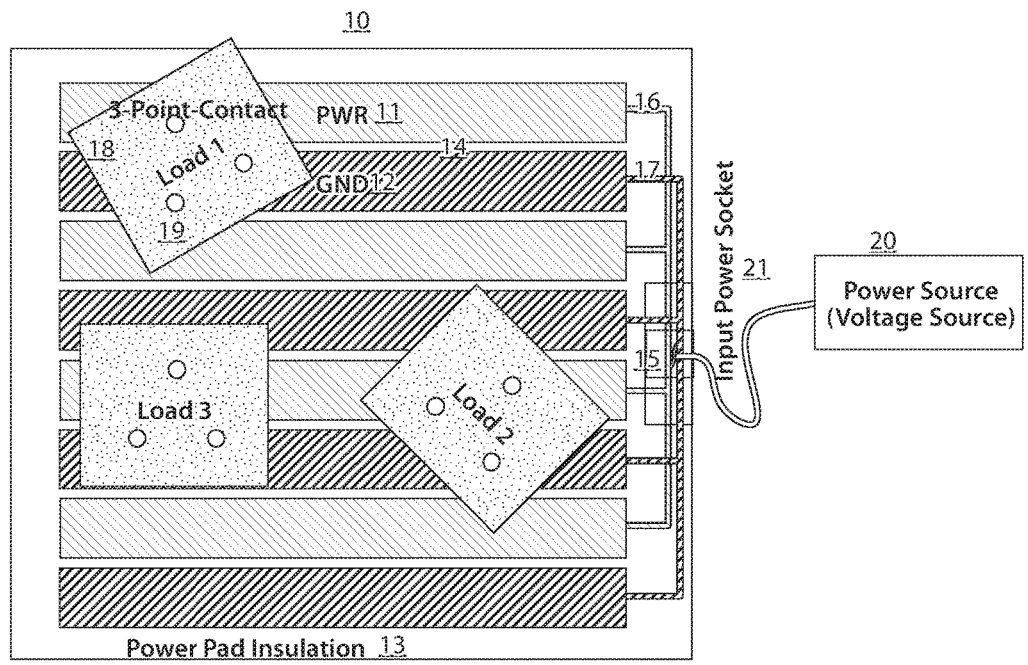
FIG. 1 shows a block diagram of a 3-point-contact power pad for battery charger.

It is to be understood that the figures and descriptions of the present disclosure have been simplified to illustrate elements that are relevant for a clear understanding of the discussed embodiments, while eliminating, for the purpose of clarity, many other elements found in known apparatuses, systems, and methods. Those of ordinary skill in the art may thus recognize that other elements and/or steps are desirable and/or required in implementing the disclosure. However, because such elements and steps are known in the art, and because they consequently do not facilitate a better understanding of the disclosure, for the sake of brevity a discussion of such elements and steps is not provided herein. Nevertheless, the disclosure herein is directed to all such elements and steps, including all variations and modifications to the disclosed elements and methods, known to those skilled in the art.

Exemplary embodiments are provided so that this disclosure will be thorough, and will fully convey the scope to those who are skilled in the art. Numerous specific details are set forth, such as examples of specific components, devices, and methods, to enable a thorough understanding of embodiments of the present disclosure. It will be apparent to those skilled in the art that specific details need not be employed, that is, that the exemplary embodiments may be embodied in many different forms and thus should not be construed to limit the scope of the disclosure. For example, in some exemplary embodiments, well-known processes, well-known device structures, and well-known technologies are not described in detail.

The terminology used herein is for the purpose of describing particular example embodiments only and is thus not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

As to the methods discussed herein, the method steps, processes, and operations described herein are not to be construed as necessarily requiring their performance in the particular order discussed or illustrated, unless specifically identified as having an order of performance. It is also to be understood that additional or alternative steps may be employed.

When an element or layer is referred to as being "on", "atop", "engaged to", "connected to," "coupled to," or a like term or phrase with respect to another element or layer, it may be directly on, engaged, connected or coupled to the other element or layer, or intervening elements or layers may be present. In contrast, when an element is referred to as being "directly on," "directly engaged to", "directly connected to", "directly atop", or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The various exemplary embodiments will be described herein below with reference to the accompanying drawings. In the following description and the drawings, well-known functions or constructions are not shown or described in detail since they may obscure the disclosed embodiments with the unnecessary detail.

The disclosure is directed, in part, to a contact-point charging apparatus, system and method for power transfer. A multi-contact-point power pad, such as in conjunction with a device-resident 3-point triangular contact, may be used in certain embodiments to transfer electricity from a power source to a load. Accordingly, in exemplary embodiments, contact-based power transfer may be achieved. This transfer may be categorized as a wireless power transfer since it doesn't require cables connecting a power source to a battery charger. Instead, according to embodiments, the power pad and a device's contact-point power configuration (e.g., a 3-point triangular contact configuration of device locations, also referred to herein as "charging balls") make the bridge between the power source and a battery charger load. Moreover, power can be transferred to several loads simultaneously or substantially simultaneously, depending on the pad rating power and its surface area.

By way of non-limiting example, such a contact-point power pad and power transfer configuration may be applied to a wide variety of systems from small hand-held devices, like a cell phone, to higher power devices, such as lap top computers. In certain embodiments of the disclosure, the input power to the pad may be a regulated or non-regulated DC voltage source with a certain power rating and a certain voltage or voltage range, such as may depend on the device battery charger specifications. For example, battery chargers for cell phones, tablets and laptop computers often use a regulated input DC voltage, while there are some industrial battery chargers which accept a non-regulated DC voltage as input (within a certain range). Depending on the region of application (e.g., US, Europe, etc.), input power source (mains, solar, or a DC power supply), and desired power level, the pad may be sourced by any type of a 3-phase/1-phase, isolated/non-isolated, PFC/non-PFC AC/DC converter, a DC power supply, or a solar fed DC/DC converter, by way of non-limiting example.

FIG. 1 shows diagrammatically a point contact power pad 10 suitable for simultaneously (or substantially simultaneously) charging of one or more batteries according to certain embodiments. Power pad 10 is shown in a rectangular shape but can take different shapes such as square, ellipse or other shapes. The surface area provided by the pad may be sized according to the intended device or devices to be charged, the required device power or the number of different power areas on the same pad 10, and/or the number of battery chargers that may be electrically coupled to (such as by being laid down upon) power pad 10 at the same time. Further, the size and/or provided power from the pad may be variable, such as through the use of a foldable, rollable or otherwise flexible pad for the variable size, and such as through the use of manually or automatically variable power settings for the variable power.

The pad 10 may provide an insulated base plate/pad 13 for hosting the power pad conductive segments. Such a pad may electrically insulate power (PWR) strips from ground (GND) strips, such as, in part, using the disclosed insulated ridges therebetween. The pad may, in conjunction with the base plate, provide a flat or non-flat charging surface that mitigates a risk of the PWR and GND strips being short circuited by external objects.

Power PWR 11 and ground GND 12 strips form the conductive path for power transfer between a power source and the load(s). These strips may take any conventional conductive form and composition, such as copper or aluminum strips. The PWR 11 and GND 12 strips are illustratively shown in rectangular shapes but may be provided in numerous different shapes and sizes, such as rectangular, circular, trapezoidal, triangular, hexagonal, or pentagonal, and may take the form of pads, points, segments, or the like. The number of strips and their size, such as their respective length, width, and thickness may be any suitable value and/or may vary considering the operating voltage, rating power, maximum number of chargeable batteries, and the size of the charging contacts, such as the 3-point triangular contact balls as discussed herein. Strip thickness may, in certain embodiments of the present invention, be determined by, or be merely sufficient to support, the maximum current density and mechanical strength desired. In certain embodiments, the configuration of strips is such that the connection between the power source and the battery charger is achieved regardless of how the charger is located on the power pad. The PWR and GND strips may be positioned atop, or embedded in, the insulating pad 13, by way of example.

Referring still to FIG. 1, the illustrated insulation base pad 13 takes the form of a base plate of the power pad with the conductive parts accessible from the top thereof. The insulation base pad is shown as rectangular in shape, although any shape, size, thickness, or rigidity may be provided. In the illustrated embodiment, insulation ridges 14 are provided between the PWR 11 and GND 12 strips, and may be integral with base pad/plate 13.

In the illustrated embodiment, the ridges 14 advantageously provide electrical separation between the alternately charged strips and may mitigate any need for spring-supported or otherwise flexible contacts, and may additionally eliminate the need for a $4^{th}$ point contact in lieu of or addition to a 3-point contact 19 on the device battery charger. That is, the forced alignment that may be provided by the ridges 14 may allow for the use of 3 contact points, rather than 4 or more contact points, and may allow for those 3 contact points to be substantially rigid in their construction.

In the illustrated embodiment, ridges 14 also advantageously protect the power pad against short circuit by external conductive objects such as coins, keys, etc., contacting both the PWR and GND strips, by way of non-limiting example. Ridges 14 may take various forms and compositions, and may be insulators as discussed above, dielectrics, or any other composition or compositions known to those skilled in the art.

Input power socket 15 receives power through power cord 21 from power source 20. For example, a main power socket may be used for receiving power from a DC power source that is sized and rated according to the DC voltage and required power, may be used to power the pad. The external power source may connect to the main power socket through a two wire cable. This power source may connect a regulated or non-regulated voltage source to PWR and GND rails. The power source may be or receive power from any suitable voltage source, such as a 3-phase/1-phase, isolated/non-isolated, PFC/non-PFC AC/DC converter, a DC power supply, or a solar fed DC/DC converter. Power socket 15 connects to the PWR 16 and GND 17 wiring network 710 connected to the PWR and GND strips.

The power socket circuitry may also include protective devices, such as fuse(s) and/or temperature switch(es). Such protective devices may prevent breakdown, overload, or mischarging, and may have the data therefrom recorded on one or more computing memories associated with the charging pad.

Battery charger 18 forms the load for the disclosed power pad, and its physical size and its power rating may differ for different applications. In certain embodiments, the battery charger and power pad rating voltages match and several different chargers can be powered by the power pad simultaneously (or substantially simultaneously).

In certain embodiments, 3-point contact balls 19 may be provided on the device in need of charging. That is, one or more 3-pin equilateral triangle contacts may be provided and/or protrude from/through a battery charger enclosure, by way of non-limiting example. The three contact pins ("balls" or "bumps") may be used to engage, e.g., electrically contact, the power pad's PWR and GND strips under varying circumstances (e.g., varying lateral and/or angular placements). Unlike traditional 4-point-contact configurations, the connection between the power source and the battery charger will be better assured, and deformation of the pins or flexibility in the length tolerance thereof will not be necessary to maintain that connection.

Each of the protruding contacts, e.g., contact balls, may be connected to the input of the battery charger system through, for example, a plurality of diodes, such as two diodes per contact ball, for blocking reverse currents and providing for safe connections. Accordingly, six diodes, for example, may be used to provide electrical interconnectivity between 3-point-contact pins and the two terminals of the input of the battery charger.

In certain exemplary embodiments, the contact balls may not be supported by springs and may instead, for example, be fixed (e.g., soldered) to a charger integrated circuit or PCB. This may advantageously result in simplicity, lower cost, and higher reliability and robustness as compared, for example, to a spring-based contact configuration.

Figure 2:
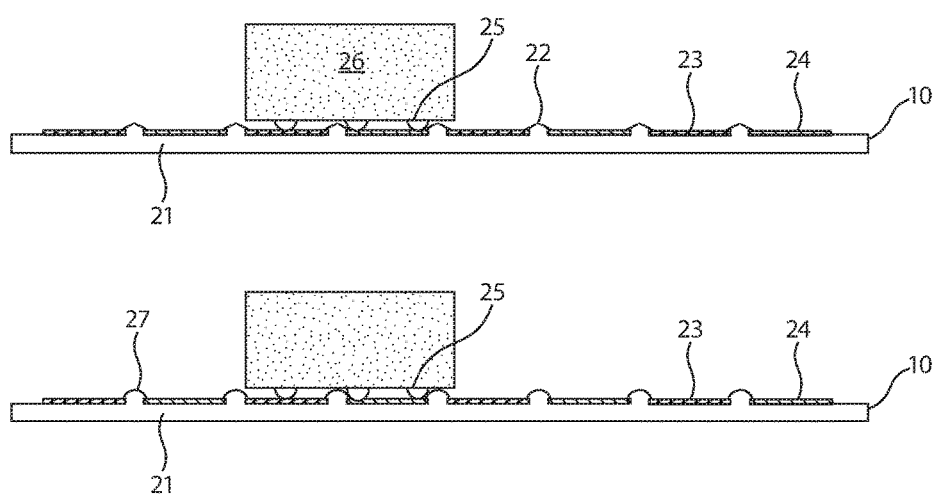
FIG. 2 shows a block diagram illustrating the power pads configurations.

Referring now also to FIG. 2, there are shown side views of a power pad 10 and battery charger 26, insulation pad 21 and insulation ridges 22, according to certain exemplary embodiments. In the illustrations of FIG. 2, power socket 15 is not shown. In the illustrated embodiments, insulation pad 21 and insulation ridges 22 are configured such that PWR 24 and GND 23 strips are embedded in the insulation pad, although other configurations may be used as discussed herein.

Insulation ridges 22 provide for a stable 3-point contact from the battery charger, for example. In the illustrated embodiments, ridge 22 tips are shown to be triangular 22 or circular 27 but may be provided in a different shapes or sizes, provided, for example, that the coefficient of friction of the ridges is sufficiently low to enable laying down of a charger 26 (e.g., 3-point contact) on the power pad 10 surface so as to be forced to engage strips 23, 24. That is, ridges and/or ridge tips may be rectangular, square, ellipsoidal, triangular, hexagonal, pentagonal, hemispherical, or any other shape, preferably such that when a pin sits on a ridge, it slips from the insulation ridge to the proximate conductive strip and thereby forces the balls to sit on the pad's conductive surfaces under varying conditions to make a connection between the power source and the load. Moreover, according to illustrative embodiments, ridge height may be short enough such that the pins of a contact will be located on both sides of a ridge but the ridge tips don't touch the charger enclosure surface, i.e., the battery charger will not remain suspended and hence not in contact with a charged strip. Exemplary materials for the ridges may include, by way of non-limiting example, plastics, dielectrics, rubber, and various other insulators and low-conductivity materials as may be understood to the skilled artisan.

Figure 3:
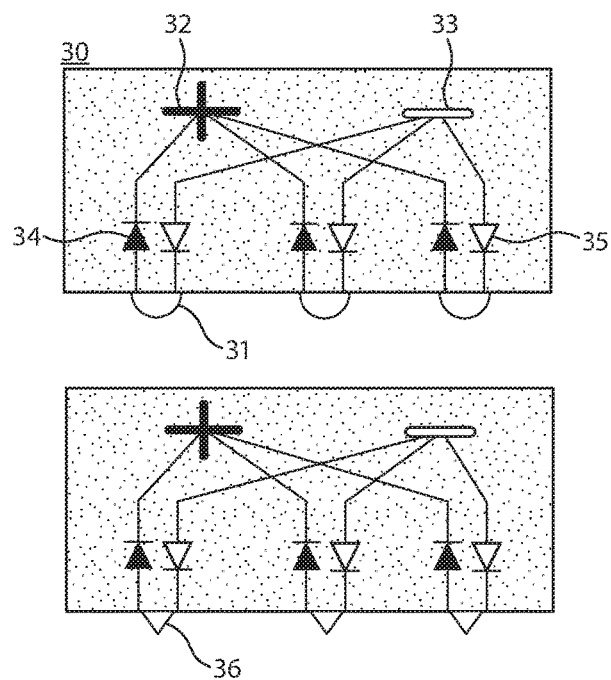
FIG. 3 shows a block diagram illustrating the 3-point contact and its connections to the charger input terminals through diodes.

Referring now also to FIG. 3, there is shown an exemplary electrical interconnection between 3-point contact balls 31 and battery charger 30 input terminals, +/−32 and 33. Since each ball of the 3-point contact can be connected to either PWR or GND during different chargings, diodes 34 and 35 establish the path for power transfer between the power pad and battery charger terminals, 32 and 33. Diodes 34 should be voltage and current rated based on the particular application, i.e., based on the charging power, charging rate, and the like.

Contact balls 31 may be of any suitable shape so as to engage strips 23, 24, such spherical as well as triangular (such as in the case of contacts 36), for example. According to certain embodiments, the contacts are sized, shaped, composed and generally configured to slide down the ridge tips to settle down upon and substantially evenly contact the power PWR and GND strips for charging.

Figure 4:
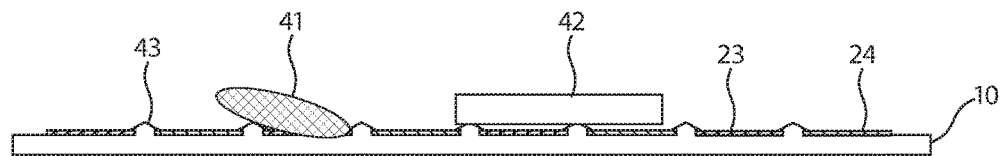
FIG. 4 shows a block diagram illustrating the power pads self protection against short circuit by external objects.

Referring now also to FIG. 4, there is shown a block diagram illustrating that the disclosed embodiments may mitigate a risk of short circuit by external objects. In the illustrated embodiment of FIG. 4, the pad may be analogous to those shown in FIGS. 1 and 2. Insulation ridges 43 help mitigate against external objects, such as coins 41 and keys 42, providing an electrical short across PWR 23 and GND 24 strips. By way of further non-limiting explanation, the disclosed configuration may provide for charging several batteries simultaneously (or substantially simultaneously) and wirelessly. Such a configuration may be cost effective, and relatively simple in design and implementation, yet provide a robust solution as compared, for example, to a 4-contact-point power pad or contact-less power pads.

Figure 5:
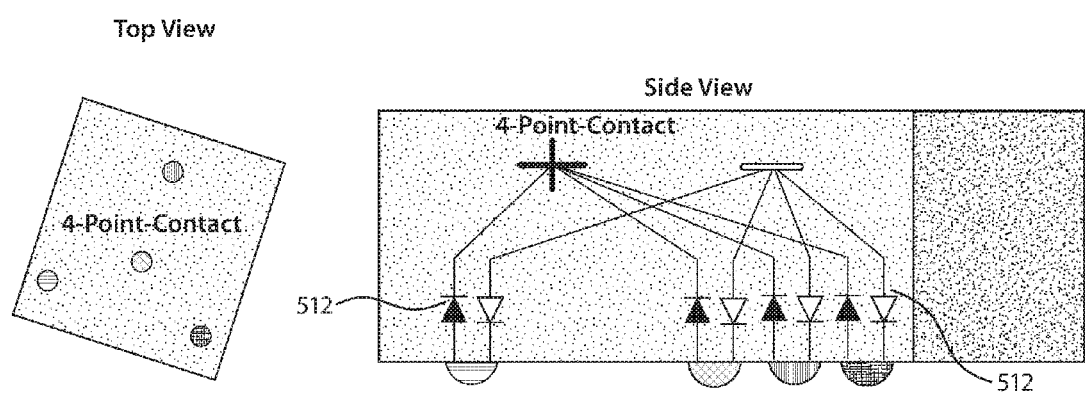
FIG. 5 shows a block diagram illustrating reverse current blocking diodes for charging balls on a device.

By way of further, non-limiting explanation, a 4-contact-point power pad may generally take the form of a 3-pin equilateral triangle contact with one extra pin in the middle of the triangle. The 4-pin contact will generally be attached to the battery charger enclosure and make the connection between the power pad and the charger device through, for example, 8 diodes 512, as shown in FIG. 5. Because of the 4 pin connections, and the length tolerance and lack of deformation thereof, to better ensure the physical contact between the power pad and the charger, the 4 pins or balls need to be non-rigid and/or flexibly supported, such as individually by springs. In such a configuration, the charger weight may press against these springs to provide for better contact between the pins and the power pad conductive area(s). However, implementing these springs adds cost and complexity to the system, and may reduce system reliability and robustness.

Thus, according to certain embodiments of the present invention, a 3-contact-point configuration, such as in the form of an equilateral triangle in which springs or like-flexible aspects need not be used, may be provided. As a result, the contact-point balls or pins attached to the charger may be fixed and rigid, and may nevertheless establish a sound physical and electrical connection between the power pad and the charger input terminal.

That is, the power pad may be configured such that the 3-point contact pins establish a sufficient connection between the power source and the load under different relative placements, e.g., across varying lateral and rotational or angular positionings. According to certain embodiments, the insulating pad insulation may be extended, or provided with an additional insulation, among the power and ground strips to form insulation ridges or otherwise raised portions, such as at the perimeter of the charging area to account for different relative placements.

By way of further non-limiting example, the aforementioned contact-less approaches to wireless charging, including inductive chargers and capacitive coupled matrix pad chargers, rely on the data transfer between the transmitter (power source) and receiver (battery charger), which adds more complexity, uncertainty and cost to the system. On the other hand, a 3-contact-point and power pad configuration according to certain disclosed embodiments establishes a direct (e.g., physically contacted) connection between the power source and the load or battery charger, and as a result there is no or little need for wireless data transfer—although wireless communication may be made available within the disclosed pad, such as to allow for interoperability on the Internet of things (IoT), by way of example.

Additionally, typical contact-less approaches may be dependent on the battery charger location, and as a result, under some circumstances, these approaches lose their functionality. But, according to disclosed embodiments, the power pad and a 3-contact may be configured in a way that, even under varying conditions and locations, the connection established between the pad and the charger will be functional.

The wireless capabilities of the power pad may include other wireless capabilities in addition to the aforementioned networking connectivity. For example, the power pad 610 may provide one or more magnetic resonators 612 capable of efficiently and wirelessly transferring power 640 over distance via the magnetic near-field 614. As such, the magnetic resonators 612 may serve as a power source, and one or more mobile devices 620 may include resonance power field capture electronics 622 whereby each mobile device 620 receives an electrical charge via the resonance capture.

Figure 6:
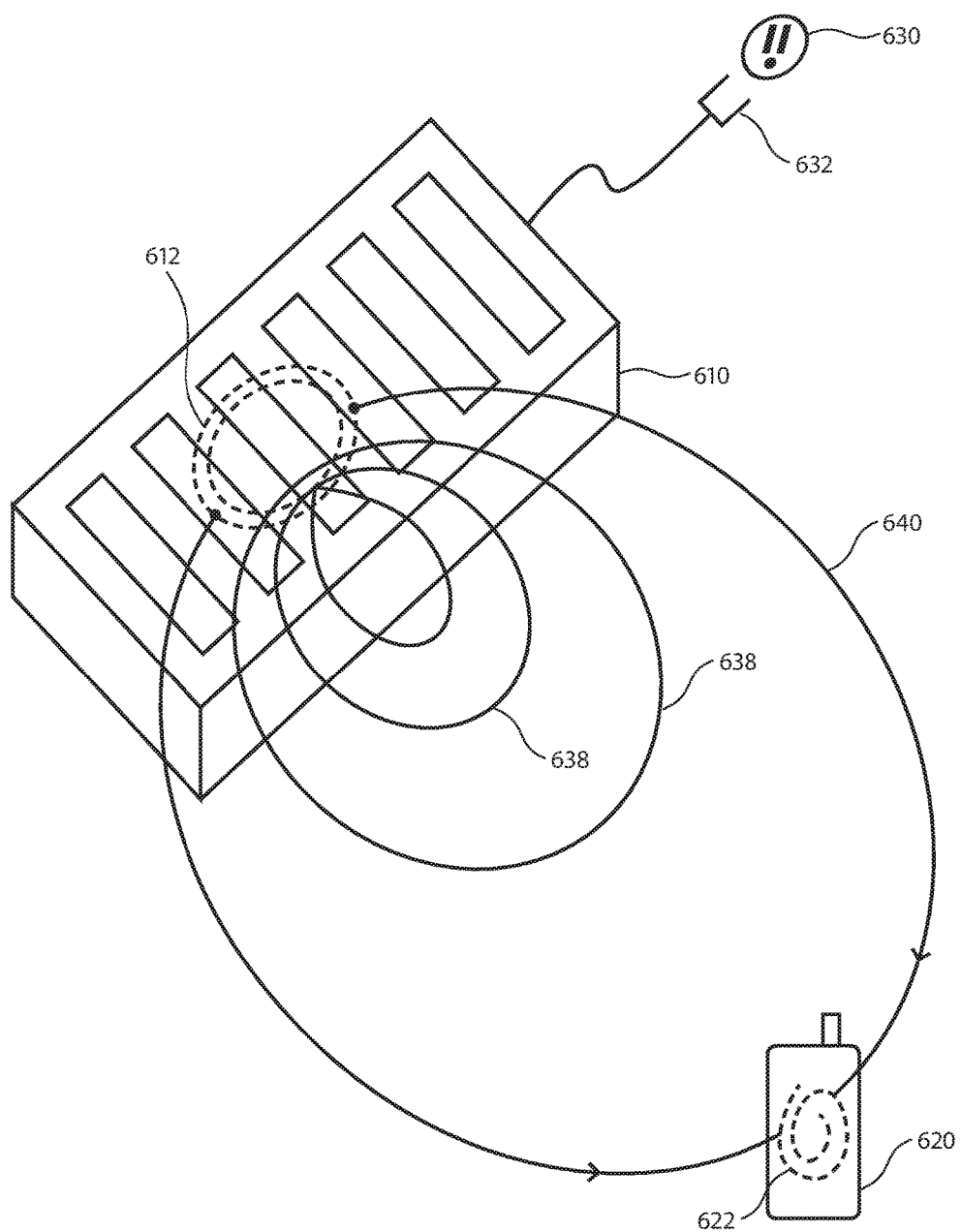
FIG. 6 is a diagram illustrating a power pad having wireless, contactless charging capabilities.

In the exemplary embodiment illustrated in FIG. 6, the at least one magnetic resonator 612 may be provided in the charging pad 610, such as the charging pad shown and discussed in the illustrative embodiments of FIGS. 1-5. As such, the exemplary charging pad 610 may be capable of both wireless contact and contactless charging.

The source resonator of charging pad may be connected to AC power 630, such as through the same or a different cord 632 as that which delivers DC-converted AC power to the charging pad. The source resonator then induces a magnetic near field 638 as shown in the illustration of FIG. 6. The resonant power field 640 resultant from the magnetic field 638 may then be received by one or more mobile devices, as illustrated, and the power thus delivered may vary in accordance with the power requirements of the receiving device. As those skilled in the pertinent arts will appreciate, the resonant field may be encoded as between the mobile device and the charging pad, such as to provide enhanced security in the wireless system and/or to limit that charged devices only to those devices authorized to receive a charge.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

Moreover, it can be seen that various features may be grouped together in a single embodiment during the course of discussion for the purpose of streamlining the disclosure.

This method of disclosure is not to be interpreted as reflecting an intention that any claimed embodiments require more features than are expressly recited in each claim.

What is claimed is:

1. A power pad, comprising:
   a base;
   a plurality of alternately charged strips electrically connected to at least one voltage source and associated with the base; and
   a plurality of low friction insulating ridges interstitially between alternating ones of the alternately charged strips for slidably distributing at least one of at least three received electrical contacts onto a first charged one of the alternately charged strips, and at least a second of the at least three electrical contacts onto a differently charged one of the at least three electrical contacts.

2. The power pad of claim 1, wherein the base is flexible.

3. The power pad of claim 2, wherein the plurality of alternately charged strips are flexible.

4. The power pad of claim 2, wherein the low friction insulating ridges are flexible.

5. The power pad of claim 1, wherein the plurality of alternately charged strips comprise one of copper and aluminum.

6. The power pad of claim 1, wherein the plurality of alternately charged strips comprise pads.

7. The power pad of claim 1, wherein the voltage source comprises a DC voltage source.

8. The power pad of claim 1, wherein the DC voltage comprises an AC-DC converted source.

9. The power pad of claim 1, wherein the voltage source is manually adjustable.

10. The power pad of claim 1, further comprising a networked communication connection.

11. The power pad of claim 10, wherein the voltage source is remotely controllable over the networked communication connection.

12. The power pad of claim 1, wherein the plurality of raised insulating ridges comprises one of a rectangular, a square, an ellipsoidal, a triangular, a hexagonal, a pentagonal, and a hemispherical shape.

13. The power pad of claim 1, wherein the plurality of raised insulating ridges comprises a composition of one of a plastic, a rubber, and a dieletric.

14. The power pad of claim 1, wherein a height of the plurality of raised ridges is less than a height of the at least three electrical contacts.

15. The power pad of claim 1, wherein the received at least three electrical contact pads are associated with a mobile device having at least one battery.

16. The power pad of claim 1, wherein the alternately charged strips recharge the at least one battery through the at least three electrical contacts.

17. The power pad of claim 1, wherein the received at least three electrical contacts are substantially flexible responsive to one of the insulating ridges and the alternately charged strips.

18. The power pad of claim 1, wherein the received at least three electrical contacts are substantially inflexible responsive to one of the insulating ridges and the alternately charged strips.

19. The power pad of claim 1, wherein a received pattern of the at least three electrical contacts on the alternately charged strips is an equilateral triangle.

20. The power pad of claim 19, wherein the equilateral triangle comprises at least a fourth center contact point.

* * * * *